US009185074B2

United States Patent
Conrad

(10) Patent No.: US 9,185,074 B2
(45) Date of Patent: Nov. 10, 2015

(54) METHOD AND SYSTEM FOR GENERATING RANGES OF INTERNET PROTOCOL ADDRESSES

(75) Inventor: Jeffrey R. Conrad, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3717 days.

(21) Appl. No.: 10/883,851

(22) Filed: Jul. 6, 2004

(65) Prior Publication Data

US 2006/0018325 A1 Jan. 26, 2006

(51) Int. Cl.
*H04L 29/12* (2006.01)

(52) U.S. Cl.
CPC .......... *H04L 61/35* (2013.01); *H04L 29/12009* (2013.01); *H04L 29/12783* (2013.01); *H04L 29/12801* (2013.01); *H04L 29/12933* (2013.01); *H04L 61/6004* (2013.01); *H04L 61/6068* (2013.01)

(58) Field of Classification Search
CPC ................... H04L 29/12009; H04L 29/12933; H04L 29/12801
USPC ............. 370/401, 465, 242, 395.52; 709/220, 709/223, 249, 224, 203, 217, 219; 713/726, 713/200, 201, 202; 726/14; 711/202
See application file for complete search history.

(56) References Cited

U.S. PATENT DOCUMENTS

| | | | | |
|---|---|---|---|---|
| 5,710,885 A * | 1/1998 | Bondi | ........................... | 709/224 |
| 6,249,814 B1 * | 6/2001 | Shaffer et al. | ................. | 709/223 |
| 6,262,988 B1 * | 7/2001 | Vig | ................................ | 370/401 |
| 6,289,414 B1 * | 9/2001 | Feldmeier et al. | ............ | 711/108 |
| 6,301,667 B1 * | 10/2001 | Digiacomo et al. | ............ | 726/14 |
| 6,469,986 B1 * | 10/2002 | Lecheler et al. | ............... | 370/252 |
| 6,789,104 B1 * | 9/2004 | Yamaguchi et al. | .......... | 709/203 |
| 6,816,897 B2 * | 11/2004 | McGuire | ....................... | 709/223 |
| 7,281,036 B1 * | 10/2007 | Lu et al. | ........................ | 709/220 |
| 7,301,909 B2 * | 11/2007 | Langevin et al. | ............. | 370/242 |
| 7,454,488 B2 * | 11/2008 | Wechter et al. | ............... | 709/223 |
| 7,512,136 B2 * | 3/2009 | Korotin | ......................... | 370/401 |
| 2002/0009056 A1 * | 1/2002 | Kanehara | ...................... | 370/255 |
| 2002/0131448 A1 * | 9/2002 | Shiba | ............................. | 370/465 |
| 2003/0086425 A1 * | 5/2003 | Bearden et al. | ............... | 370/392 |
| 2003/0115367 A1 * | 6/2003 | Ohara | ........................... | 709/249 |
| 2004/0031052 A1 * | 2/2004 | Wannamaker et al. | ......... | 725/61 |

OTHER PUBLICATIONS

Mark Aa. Sportack, IP Addressing Fundamentals, Oct. 31, 2010, Chapter 3.*

* cited by examiner

*Primary Examiner* — Edan Orgad
*Assistant Examiner* — Emmanuel Maglo
(74) *Attorney, Agent, or Firm* — Buchanan Ingersoll & Rooney

(57) ABSTRACT

Exemplary embodiments are directed to generating Internet Protocol (IP) addresses using a mask that is applied to a plurality IP addresses to generate plural groups of IP addresses. A range of IP addresses is generated for each of the groups when the plurality of groups is less than or equal to a predetermined number of groups. When a range of IP addresses is selected from the plurality of ranges IP addresses, the network nodes associated with the selected range are displayed.

28 Claims, 5 Drawing Sheets

US 9,185,074 B2

METHOD AND SYSTEM FOR GENERATING RANGES OF INTERNET PROTOCOL ADDRESSES

BACKGROUND

Computer networks, such as Local Area Networks (LANs) and Metropolitan Area Networks (MANs) can be complex to operate. Corporations use network management software applications to maintain computer networks. An example of a network management software application is the Hewlett-Packard OpenView Network Node Manager (NNM) product.

In general, network management software applications are used for displaying the network topology and indicating any failures in the computer network. Once the failures in the network have been identified, a network administrator can take corrective action, such as replacing faulty routers. Many managed networks can contain hundreds or thousands of network elements (herein referred to as network nodes). It can be difficult to visualize such a large number of network nodes in a network management software application.

SUMMARY

A method of generating ranges of Internet Protocol (IP) addresses is disclosed. A mask is applied to a plurality of IP addresses to generate a plurality of groups of IP addresses. A range of IP addresses is generated for each of the plurality of groups when the plurality of groups is less than or equal to a predetermined number of groups.

A management station for generating ranges of Internet Protocol (IP) addresses is also disclosed. The management station includes a memory which stores a plurality of IP addresses. The management station also includes a processor. The processor receives the plurality of IP addresses and applies a mask to the plurality of IP addresses to generate a plurality of groups of IP addresses. The processor generates a range of IP addresses for each of the plurality of groups when the plurality of groups is less than or equal to a predetermined number of groups.

An apparatus for generating ranges of Internet Protocol (IP) addresses includes means for storing a plurality of IP addresses, and means for applying a mask to the plurality of IP addresses to generate a plurality of groups of IP addresses, and for generating a range of IP addresses for each of the plurality of groups when the number of groups is less than or equal to a predetermined number.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION

Figure 1:
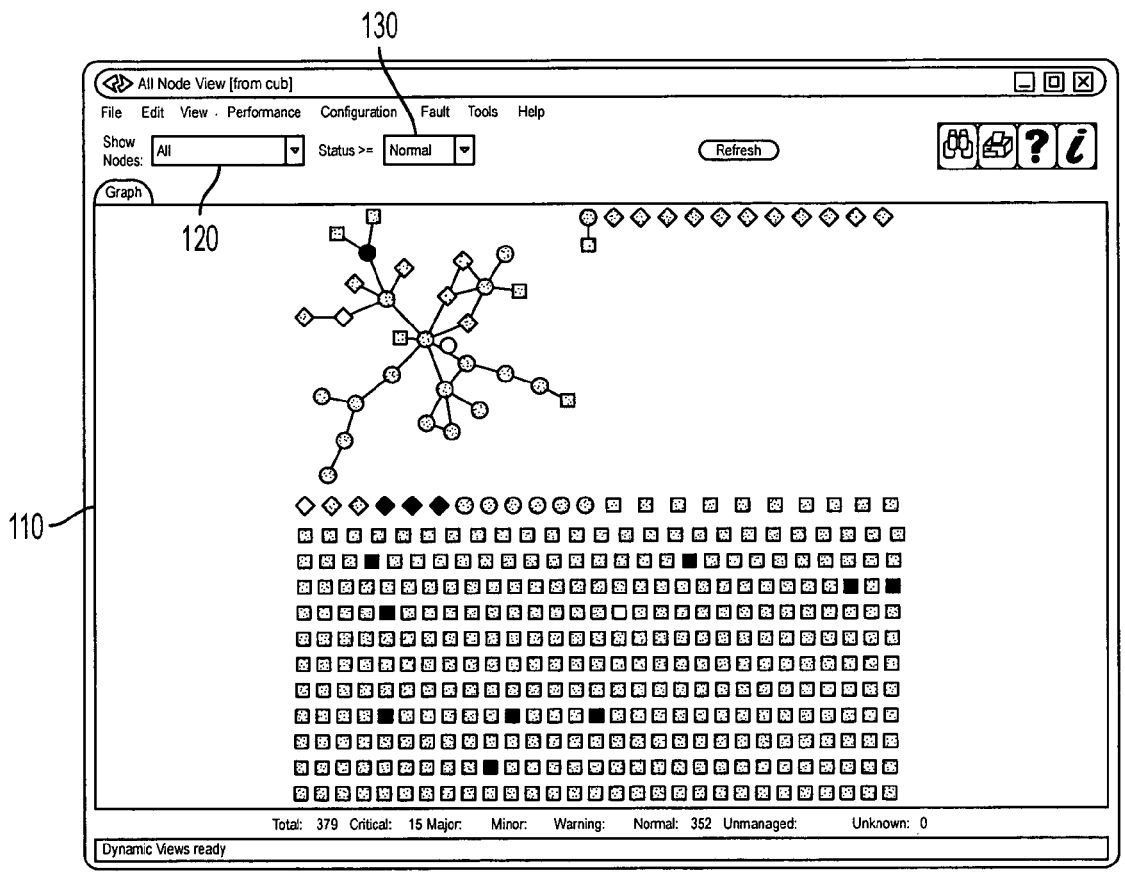
FIG. 1 is an exemplary display for a network management software application.

FIG. 1 illustrates an exemplary display of a network management software application. The display includes a graph portion 110 which displays a plurality of the nodes in the network monitored by the network management software application. The display also includes a first filter selector 120 and a second filter selector 130. The first and second filter selectors 120 and 130 are employed to select particular nodes of the monitor network for display. In the display of FIG. 1 the filter selectors 120 and 130 are selected such that all nodes which have a normal status are displayed. Accordingly, graph 110 displays only those nodes which have a status of normal, and not the nodes which have a status of critical, major, minor, warning, unmanaged or unknown. Use of filter selectors 120 and 130 allow a user of the network management software application to view a subset of the total number of nodes in a network.

Figure 2:
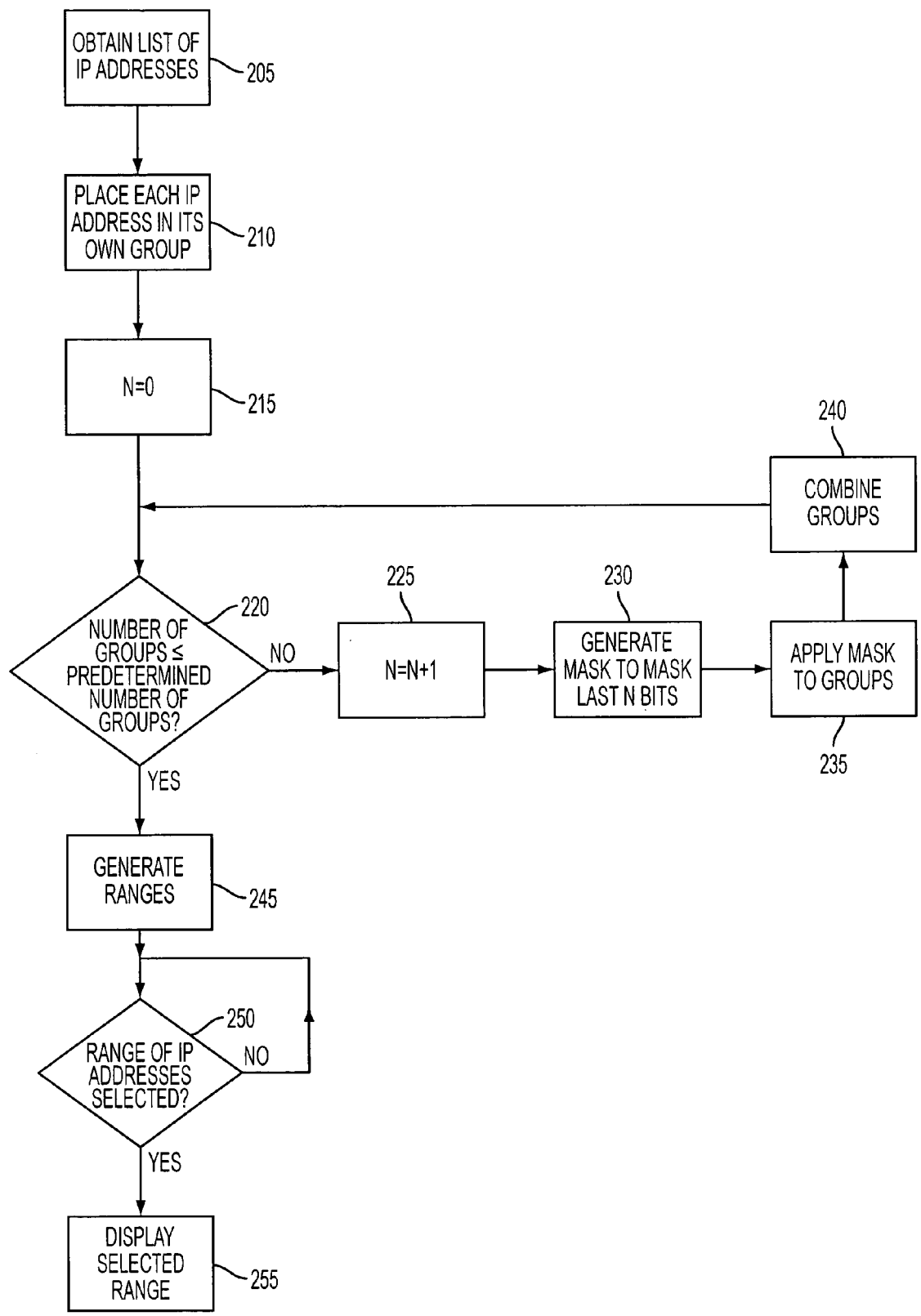
FIG. 2 is an exemplary method for generating ranges of Internet Protocol (IP) addresses.

FIG. 2 is an exemplary method for generating ranges of IP addresses. A list of IP addresses is obtained (step 205). The list of IP addresses can be obtained from the network management software application, or from any other source. Each IP address in the list is placed in its own group (step 210). A variable N, which is used for setting the size of the mask to be applied IP addresses, is set equal to zero (step 215). Alternatively, N can be set to another minimal grouping mask such as 8.

It is determined whether the number of groups IP addresses is less than or equal to a predetermined number of groups (step 220). The predetermined number of groups can be selected to any value, where the value selected can, for example, be such that an operator of the network management software application, when filtering IP address ranges, can easily view all of the nodes within a range on the display. It has been found that, for example, 20 groups can generally divide a network such that when a filter range from one of the 20 groups is selected, the nodes within the IP range can be easily viewed. Of course, any number of groups can be selected as predetermined number of groups.

If the number of groups is not less than or equal to the predetermined number of groups ("NO" path out decision step 220), then the variable for the mask N is incremented by a value of 1. After incrementing the value of the mask, the mask is generated to mask the last N bits (step 230). The mask is then applied to each of the groups IP addresses (step 235). The groups then are combined based upon the portion of the IP address which is in common with other IP addresses except for the masked-off portion (step 240). For example, if the mask of 255.255.255.248 (i.e., 0xFFF8) is applied to IP addresses 15.2.113.1 and 15.2.113.7, these IP addresses can be combined into the group of IP addresses defined by the IP address range of 15.2.113.0 (i.e., where the mask off bits are treated as zeros).

If it is determined that the number of groups is less than or equal to the predetermined number of groups ("YES" path out decision step 220), then address ranges are generated for each of the number of groups (step 245). Referring again to the example above, the group for the IP addresses of 15.2.113.1 and 15.2.113.7 would have a range of 15.2.113.1-7.

Steps 250 and 255 illustrate the filtering of nodes by IP address ranges. Specifically, it is determined whether a range of IP addresses is selected (step 250). If a range of IP addresses is not selected ("NO" path out decision step 250) then it is continued to be determined whether a range IP addresses are selected (step 250). If a range of IP addresses is selected ("YES" path out decision step 250), then the nodes of the selected range are displayed (step 255). Although not illustrated in FIG. 2, additional filter selection can be employed to filter the nodes which are displayed.

Figure 3:
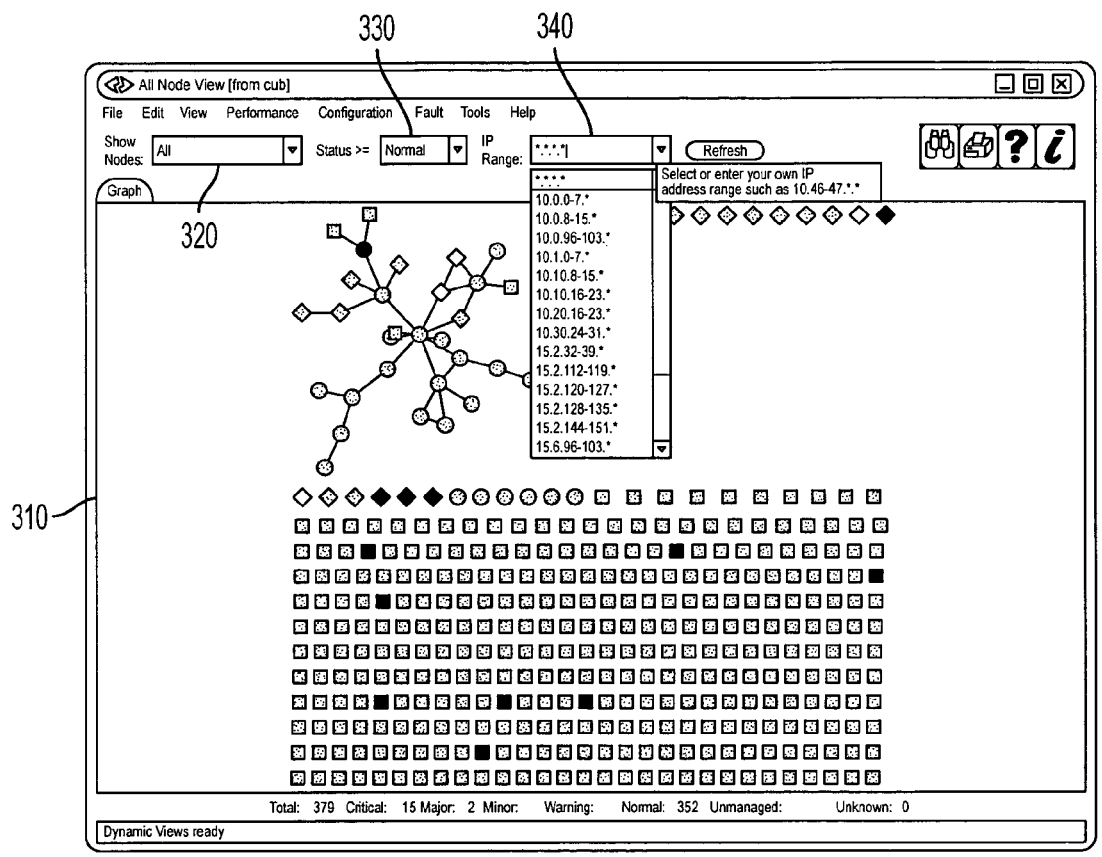
FIG. 3 is an exemplary display of a network management software application in which the display nodes can be filtered based upon IP address ranges.

FIG. 3 illustrates an exemplary display for selecting IP address ranges. As illustrated in FIG. 3, after a plurality of IP address ranges are generated by the system, any one of the IP address ranges can be selected or displayed in the graph portion of the display 310 using filter selector 340. As also illustrated in FIG. 3, other filter selections, such as filter selectors 320 and 330 can be used instead of, or in addition to, the filter selection by IP address range.

Figure 4:
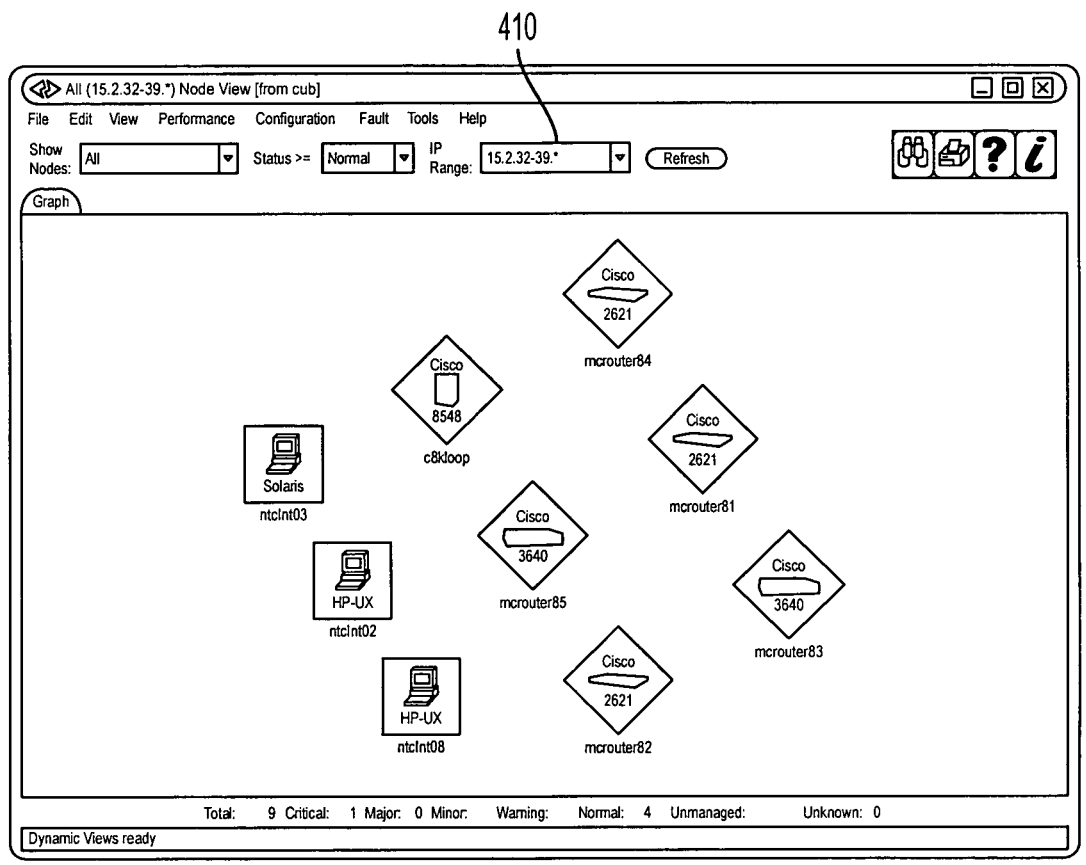
FIG. 4 is an exemplary display of a plurality of nodes within a selective range IP addresses.

FIG. 4 is an exemplary display of a number of nodes based upon the selected IP address range. Accordingly, IP address range filter selector 410 indicates that all nodes which have IP addresses within the range of 15.2.32-39.* are displayed.

The generation of IP address ranges can be performed in accordance with the following exemplary pseudo code. The first section of the pseudo code obtains a list of all of the IP address subnets as follows:

```
String[ ] getNetworkRanges( ) {
    // First, get a list of all IP address subnets. This could be a list of all IP
    // addresses known by the system. It is assumed that a network is already setup
    // with subnets, which are ranges of IP Addresses, so we start with subnet
    // ranges
    String[ ] networkRanges = getSubnetworkRanges( ); // array of strings like
"15.2.120.0"
```

Next the maximum number of groups is set, the mask is created and the groups of ranges are combined based on the mask as follows:

```
    // We want at least the last quad to be wildcarded. We avoid
    // changing the class A-like addresses, so we limit and
    // try to find the happy medium of number of values. This default starting
    // value of 8 merged bits guarantees that at least the last 8 bits of the 32 bit
    // IP address range will be wildcarded, i.e. 15.2.120.*. However, if managing
    // a really small number of addresses in the same subnet, you could start with
    // mergeBits = 0, but this makes the algorithm faster and gives at least some
    // grouping.
    final int idealNumRanges = 20;      // 20 ranges is merely an exemplary number of
                                        // ranges
    final int minMergeBits = 8;
    final int maxMergeBits = 24;        // must be less than 32, will cause the number of
                                        // ranges to be greater than idealNumRanges if
                                        // a very large network with lots of disparate IP's
    int mergeBits = minMergeBits;
    do {
        networkRanges = combineIntoRanges(networkRanges, mergeBits++);
    } while(networkRanges.length > idealNumRanges && maxMergeBits <= 24);
    return networkRanges;
}
```

Next the mask is applied to the IP addresses ranges. Specifically, each of the IP addresses ranges are split into quads and the mask is applied to the particular quad which is to be masked as follows:

```
/**
 * Make a range of choices for a list of networks, ignoring network
 * 0.0.0.0
 * @param networkRanges array of previous network ranges, or un-ranged
 * networks
 * @param numMergeBits like a subnet mask, how many bits to ignore
 * and create ranges
 * @return a (hopefully smaller) array of network ranges
 */
private static String[ ] combineIntoRanges(String[ ] networkRanges,
            int numMergeBits) {
    HashSet newSet = new HashSet( );
    for (int netNum=0; netNum < networkRanges.length; netNum++) {
        String oldRange = networkRanges[netNum];
        String[ ] quads = oldRange. split("\\.");
        long val = 0;
        for (int i=0; i<4; i++) {
            // Since we might be getting called again, we might
            // have a range. Use the lower part
            int minQuadVal = 0;
            if (quads [i].equals("*")) {
                minQuadVal = 255;
            } else {
                String[] sArray = quads [i].split("-");
                minQuadVal = Integer.parseInt(sArray[0]);
            }
            val += minQuadVal << 8*(3-i);
        }
```

If the number of groups of IP address ranges is greater then the maximum number of groups, then the mask is refined as follows:

```
long mask = 1 << numMergeBits;
mask--; // all 1's where we ignore
long minVal = val & ~mask; // turn all ignored bits to 0's
long maxVal = val | mask;
// Now convert back to quads
String newRange ="";
for (int i=0; i<4; i++) {
    if(i != 0) {
        newRange += ".";
    }
    long minQuadVal = (minVal >> 8*(3-i)) & 0xFF;
    long maxQuadVal = (maxVal >> 8*(3-i)) & 0xFF;
    if (minQuadVal == 0 && maxQuadVal ==255) {
        newRange += "*";
```

```
        } else if (minQuadVal == maxQuadVal) {
            newRange += String.valueOf(minQuadVal);
        } else {
            newRange += minQuadVal + "-" + maxQuadVal;
        }
    }
    newSet.add(newRange);
}
```

Once the number of groups of IP address ranges is less than or equal to the maximum number of groups, the groups of IP address ranges are sorted as follows:

```
    String[ ] sorted =(String[ ])newSet.toArray(new String[0]);
    Arrays.sort(sorted, new IpAddressSorter( ));    // return in IP Address sorted by
                                                    //range
    return sorted;
}
```

Various aspects will now be described in connection with exemplary embodiments in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both. Moreover, the exemplary embodiments can be considered part of any form of computer readable storage medium having stored therein an appropriate set of computer instructions that would cause a processor to carry out the techniques described herein.

Figure 5:
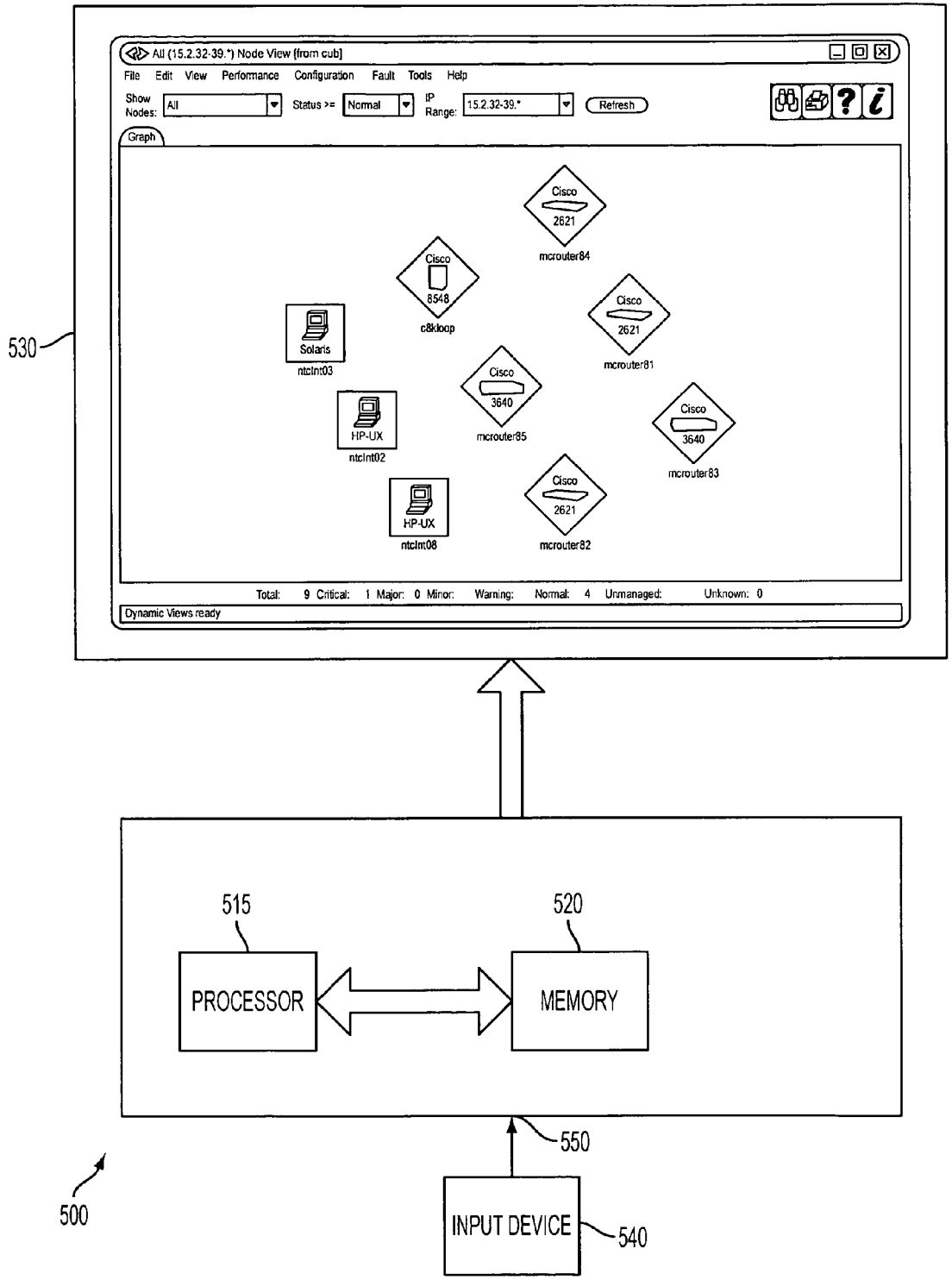
FIG. 5 is an exemplary management station.

FIG. 5 illustrates an exemplary management station. The management station 500 includes a computer 510, a display 530, and an input device 540. The computer 510 includes a means, such as a processor 515, for applying a mask and for generating a range of IP addresses. The computer 510 also includes a means for storing plural IP addresses, such as a memory 520. Processor 515 receives the plurality of IP addresses from memory 520 and applies a mask to the plurality of IP addresses to generate a plurality of groups of IP addresses. Processor 515 generates a range of IP addresses for each of the plurality of groups when the plurality of groups is less than or equal to a predetermined number of groups.

Processor 515 can apply another mask to the plurality of groups of IP addresses to generate another plurality of groups of IP addresses when the plurality of groups is greater than the predetermined number of groups, and can generate ranges of IP addresses using the another plurality of groups when the another plurality of groups is less than the predetermined number of groups. The mask identifies a first portion of an IP address to be masked and the another mask identifies a second portion of the IP address to be masked. The second portion includes the first portion.

The application of the mask by the processor 515 involves, for example, performing a logical operation, such as a logical AND operation between each of the plurality of IP addresses and the mask to generate a resultant IP address. The resultant IP address identifies one of the plurality of groups of IP addresses. The application of the mask by the processor 515 also involves applying the mask to the plurality of IP addresses to generate a plurality of masked IP addresses, and grouping masked IP addresses to generate the plurality of groups of IP addresses. The mask identifies a first portion of an IP address to be masked and a second portion of the IP address. The masked IP addresses are grouped based upon the second portion of the IP address.

The input device 540 can be a keyboard and/or a mouse. A means for selecting, such as input device 540, can be used to provide a selection to an input 550 of the computer 510. The input 550 can receive a selection of a range of IP addresses from the plurality of ranges of IP addresses. A means for displaying, such as display 530, displays network nodes associated with the selected range.

Those skilled in the art will appreciate that software, including instructions for causing a computing device or system to perform the methods or processes described herein, can be stored on a machine-readable medium. For example, the software can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used herein, a "computer readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method of generating ranges of Internet Protocol (IP) addresses comprising:
    applying a mask, by a processor, to a plurality of IP addresses to generate a plurality of groups of IP addresses; and
    generating, by the processor, a range of IP addresses for each group of the plurality of groups, the generating based on the groups of the plurality of groups being less than or equal in number to a predetermined number of groups;
    wherein the range for each group is generated based on a difference of the IP addresses already in the group.

2. The method of claim 1 comprising:
    applying another mask, by the processor, to the plurality of groups of IP addresses to generate another plurality of groups of IP addresses, the applying another mask based on the groups of the plurality of groups being greater in number than the predetermined number of groups; and generating, by the processor, new ranges of IP addresses using the another plurality of groups, the generating new ranges based on the groups of the another plurality of groups being less in number than the predetermined number of groups.

3. The method of claim 2, wherein the mask identifies a first portion of an IP address to be masked and the another mask identifies a second portion of the IP address to be masked, wherein the second portion includes the first portion.

4. The method of claim 1 comprising:
selecting, by the processor, a range of IP addresses from the plurality of ranges of IP addresses; and
displaying network nodes associated with the selected range.

5. The method of claim 1, wherein applying the mask comprises:
performing, by the processor, a logical AND operation between each of the plurality of IP addresses and the mask to generate a resultant IP address, wherein the resultant IP address identifies one of the plurality of groups of IP addresses.

6. The method of claim 1, wherein applying the mask comprises:
applying the mask, by the processor, to the plurality of IP addresses to generate a plurality of masked IP addresses; and
grouping masked IP addresses to generate the plurality of groups of IP addresses.

7. The method of claim 6, wherein the mask identifies a first portion of an IP address to be masked and a second portion of the IP address, and wherein the masked IP addresses are grouped based upon the second portion of the IP addresses.

8. A management station for generating ranges of Internet Protocol (IP) addresses comprising:
a memory which stores a plurality of IP addresses; and
a processor which receives the plurality of IP addresses and applies a mask to the plurality of IP addresses to generate a plurality of groups of IP addresses, and which generates a range of IP addresses for each of the plurality of groups, generation of the range based on the groups of the plurality of groups being less than or equal in number to a predetermined number of groups;
wherein the range for each group is generated based on a difference of the IP addresses already in the group.

9. The management station of claim 8 wherein the processor applies another mask to the plurality of groups of IP addresses to generate another plurality of groups of IP addresses, application of the another mask based on the groups of the plurality of groups being greater in number than the predetermined number of groups, and generates new ranges of IP addresses using the another plurality of groups, generation of new ranges based on the groups of the another plurality of groups being less in number than the predetermined number of groups.

10. The management station of claim 9, wherein the mask identifies a first portion of an IP address to be masked and the another mask identifies a second portion of the IP address to be masked, wherein the second portion includes the first portion.

11. The management station of claim 8 comprising:
an input which receives a selection of a range of IP addresses from the plurality of ranges of IP addresses; and
a display which displays network nodes associated with the selected range.

12. The management station of claim 8, wherein the application of the mask includes the processor performing a logical AND operation between each of the plurality of IP addresses and the mask to generate a resultant IP address, wherein the resultant IP address identifies one of the plurality of groups of IP addresses.

13. The management station of claim 8, wherein the application of the mask includes applying the mask to the plurality of IP addresses to generate a plurality of masked IP addresses, and grouping masked IP addresses to generate the plurality of groups of IP addresses.

14. The management of claim 13, wherein the mask identifies a first portion of an IP address to be masked and a second portion of the IP address, and wherein the masked IP addresses are grouped based upon the second portion of the IP addresses.

15. A non-transitory computer readable storage medium containing a computer program for generating ranges of Internet Protocol (IP) addresses, the computer program comprising instructions for:
applying a mask to a plurality of IP addresses to generate a plurality of groups of IP addresses; and
generating a range of IP addresses for each of the plurality of groups the generating based on the groups of the plurality of groups being less than or equal in number to a predetermined number of groups;
wherein the range for each group is generated based on a difference of the IP addresses already in the group.

16. The computer readable storage medium of claim 15 further comprising instructions for:
applying another mask to the plurality of groups of IP addresses to generate another plurality of groups of IP addresses, the applying another mask based on the groups of the plurality of groups being greater in number than the predetermined number of groups; and
generating new ranges of IP addresses using the another plurality of groups, the generating new ranges based on the groups of the another plurality of groups being less in number than the predetermined number of groups.

17. The computer readable storage medium of claim 16, wherein the mask identifies a first portion of an IP address to be masked and the another mask identifies a second portion of the IP address to be masked, wherein the second portion includes the first portion.

18. The computer readable storage medium of claim 15 further comprising instructions for:
selecting a range of IP addresses from the plurality of ranges of IP addresses; and
displaying network nodes associated with the selected range.

19. The computer readable storage medium of claim 15, wherein the instructions for applying the mask comprise instructions for:
performing a logical AND operation between each of the plurality of IP addresses and the mask to generate a resultant IP address, wherein the resultant IP address identifies one of the plurality of groups of IP addresses.

20. The computer readable storage medium of claim 15, wherein the instructions for applying the mask comprise instructions for:
applying the mask to the plurality of IP addresses to generate a plurality of masked IP addresses; and
grouping masked IP addresses to generate the plurality of groups of IP addresses.

21. The computer readable storage medium of claim 20, wherein the mask identifies a first portion of an IP address to be masked and a second portion of the IP address, and wherein the masked IP addresses are grouped based upon the second portion of the IP addresses.

22. An apparatus for generating ranges of Internet Protocol (IP) addresses comprising:
means for storing a plurality of IP addresses; and
means for applying a mask to the plurality of IP addresses to generate a plurality of groups of IP addresses, and for generating a range of IP addresses for each of the plurality of groups, the applying and generating based on the number of groups of the plurality of groups being less than or equal to a predetermined number;
wherein the range for each group is generated based on a difference of the IP addresses already in the group.

23. The apparatus of claim 22, wherein the means for applying and generating applies another mask to the plurality of groups of IP addresses to generate another plurality of groups of IP addresses, application of the another mask based on the groups of the plurality of groups being greater in number than the predetermined number, and generates new ranges of IP addresses using the another plurality of groups, generation of the new ranges based on the groups of the another plurality of groups being less in number than the predetermined number.

24. The apparatus of claim 23, wherein the mask identifies a first portion of an IP address to be masked and the another mask identifies a second portion of the IP address to be masked, wherein the second portion includes the first portion.

25. The apparatus of claim 22 comprising:
means for selecting a range of IP addresses from the plurality of ranges of IP addresses; and
means for displaying network nodes associated with the selected range.

26. The apparatus of claim 22, wherein applying the mask comprises:
performing a logical AND operation between each of the plurality of IP addresses and the mask to generate a resultant IP address, wherein the resultant IP address identifies one of the plurality of groups of IP addresses.

27. The apparatus of claim 22, wherein applying the mask comprises:
applying the mask to the plurality of IP addresses to generate a plurality of masked IP addresses; and
grouping masked IP addresses to generate the plurality of groups of IP addresses.

28. The apparatus of claim 27, wherein the mask identifies a first portion of an IP address to be masked and a second portion of the IP address, and wherein the masked IP addresses are grouped based upon the second portion of the IP addresses.

* * * * *